United States Patent

Daniels et al.

[11] Patent Number: 6,046,723
[45] Date of Patent: Apr. 4, 2000

[54] METHOD AND APPARATUS FOR ACHIEVING COLOR-APPEARANCE MATCHING FOR AN IMAGE VIEWED IN SURROUNDS OF DIFFERENT RELATIVE LUMINANCES

[75] Inventors: Cathleen M. Daniels; Edward J. Giorgianni, both of Rochester; Mark D. Fairchild, Honeoye Falls, all of N.Y.

[73] Assignee: Eastman Kodak Company, Rochester, N.Y.

[21] Appl. No.: 08/972,115

[22] Filed: Nov. 17, 1997

[51] Int. Cl.$^7$ ................ G06F 15/00; G03F 3/08
[52] U.S. Cl. ................ 345/150; 345/431; 355/32; 358/518; 358/527; 382/167; 430/359
[58] Field of Search ................ 345/147, 150, 345/154, 431; 348/33, 645, 713; 355/32; 358/450, 518, 523, 527; 382/167, 276; 430/358, 359, 360–363, 383

[56] References Cited

U.S. PATENT DOCUMENTS

| | | | |
|---|---|---|---|
| 5,447,811 | 9/1995 | Buhr et al. | 430/20 |
| 5,528,339 | 6/1996 | Buhr et al. | 355/32 |

OTHER PUBLICATIONS

"The Reproduction of Colour" by Dr. R. W. G. Hunt, fifth edition, 1995, p. 5.

Primary Examiner—Ba Nuynh
Attorney, Agent, or Firm—Peyton C. Watkins

[57] ABSTRACT

A method for achieving color-appearance matching for an image viewed in different surround conditions, the method comprises the steps of forming signals representing an original image; and mapping the original image signals through a transformation that alters image luminance contrast by a factor of substantially 1.01 to 1.15 for an original image viewed in a light surround to a reproduced image to be viewed in an average surround; substantially 1.01 to 1.22 for an original image viewed in a light surround to a reproduced image to be viewed in dim surround; substantially a range of 1.01 to 1.29 for an original image viewed in a light surround to a reproduced image to be viewed in an dark surround; substantially a range of 1.01 to 1.11 for an original image viewed in an average surround to a reproduced image to be viewed in an dim surround; substantially a range of 1.01 to 1.22 for an original image viewed in an average surround to a reproduced image to be viewed in an dark surround; and substantially a range of 1.01 to 1.21 for an original image viewed in an dim surround to a reproduced image to be viewed in an dark surround for achieving color-appearance matching of a reproduced image to the original image.

12 Claims, 2 Drawing Sheets

METHOD AND APPARATUS FOR ACHIEVING COLOR-APPEARANCE MATCHING FOR AN IMAGE VIEWED IN SURROUNDS OF DIFFERENT RELATIVE LUMINANCES

CROSS-REFERENCE TO RELATED APPLICATIONS

The present application is related to U.S. application Ser. No. 08/059,060, filed May 7, 1993, by Edward J. Giorgianni et. al., and entitled, "Method and Associated Apparatus Which Achieve Imaging Device/Media Compatibility and Color-Appearance Matching".

FIELD OF THE INVENTION

The invention relates generally to the field of color-appearance matching having color-appearance-transformation parameters and/or color-appearance-model parameters that are used for achieving color matching for an image viewed in different surrounds, and, more particularly, to achieving such color matching by utilizing improved color-appearance-transformation parameters and/or color-appearance model parameters.

BACKGROUND OF THE INVENTION

It is well known in color science that the same pictorial image may have different color appearances if viewed in different environments. In particular, the visual appearance of an image will change if the conditions of its surround (the area immediately adjacent to and surrounding the image) are changed.

Changes in the image surround conditions are commonly encountered in practice. In digital image reproduction, images may be scanned, electronically transmitted, and then viewed in surrounds different from that of the original image. For example, a digital imaging system may create an overhead or 35 mm projection slide from an original reflection image, and the slide may then be viewed in a surround condition quite different from that of the original image. Similarly, an imaging system may produce images on a variety of different output media, each of which is viewed in a different surround condition.

Currently, color-appearance-model parameters are used (via transformations of digital images) for matching the color appearance of the image between different surround conditions. In particular, such parameters are used to account for the fact that an observer's perceived lightness contrast of the image will be influenced by the relationship of the luminance of the surround to the average luminance of the image itself. A surround-parameter having a value of 1.50, for example, would indicate that the perceived lightness contrast of the image will be reduced by a factor of 1/1.50 and that the luminance contrast of the image would have to be raised by a factor of 1.50 in order to compensate for this perceived reduction.

Presently, either of two sets of color-appearance-model parameter values are used to account for such changes in perceived lightness contrast as a function of the surround. The parameter values used are dependent on the relationship of the luminance of the surround to that of the image. The terminology traditionally used to describe this relationship is as follows: the surround is defined as "dark" if the surround luminance is significantly less than that of the image; the surround is defined as "average" (or sometimes as "light") if the surround luminance is greater than or similar to that of the image; and the surround is defined as "dim" if the surround is between "dark" and "average/light." R.W.G. Hunt describes a surround-compensation transformation in The Reproduction of Colour and a color-appearance model in Measuring Colour that include surround parameters having a value of 1.50 for a dark surround, a value of 1.25 for a dim surround, and a value of 1.00 for an average/light surround. Alternatively, U.S. Pat. No. 5,447,811 by Buhr et. al. discloses a surround-compensation transformation having a parameter value of 1.30 for a dark surround, a parameter value of 1.10 for a dim surround, and a parameter value of 1.00 for an average/light surround.

The parameter values in these and other presently known color-appearance models and transformations typically are based on experiments employing simple test stimuli. As a result, the parameter values of presently known and utilized color-appearance models and transformations, while appropriate for such stimuli, may not be appropriate for applications involving more complex stimuli such as pictorial images. Therefore, improved parameter values are needed for such applications in order to achieve better color-appearance matching in different surrounds than possible with existing values.

SUMMARY OF THE INVENTION

To that end, the applicants have performed a series of visual experiments designed to determine such improved parameter values. The present invention is derived from two unexpected findings of these experiments. The first finding is that the dark-surround and dim-surround parameter values used in existing color-appearance models and transformations significantly overestimate the perceived effect of the surround for applications involving pictorial images. The second finding is that, although existing models do not differentiate between average and light surrounds by using different parameter values, significantly different values actually are required for these surrounds in applications involving pictorial images.

The present invention is directed to overcoming one or more of the problems set forth above. Briefly summarized, according to one aspect of the present invention, the invention resides in a method for achieving color-appearance matching for an image viewed in different surround conditions, the method comprising the steps of: (a) froming signals representing an original image; and (b) mapping the original image signals through a transformation that alters image luminance contrast by a factor of substantially 1.01 to 1.15 for an original image viewed in a light surround to a reproduced image to be viewed in an average surround; substantially 1.01 to 1.22 for an original image viewed in a light surround to a reproduced image to be viewed in a dim surround; substantially a range of 1.01 to 1.29 for an original image viewed in a light surround to a reproduced image to be viewed in a dark surround; substantially a range of 1.01 to 1.11 for an original image viewed in an average surround to a reproduced image to be viewed in a dim surround; substantially a range of 1.01 to 1.22 for an original image viewed in an average surround to a reproduced image to be viewed in a dark surround; substantially a range of 1.01 to 1.21 for an original image viewed in a dim surround to a reproduced image to be viewed in a dark surround; substantially a range of 0.87 to 0.99 for an original image viewed in an average surround to a reproduced image to be viewed in a light surround; substantially a range of 0.82 to 0.99 for an original image viewed in a dim surround to a reproduced image to be viewed in a light surround; substantially a range of 0.90 to 0.99 for an original image viewed in a dim surround to a reproduced image to be viewed in an average surround; substantially a range of 0.78 to 0.99 for an original image viewed in a dark surround to a reproduced image to be viewed in a light surround; substantially a range of 0.82 to 0.99 for an original image viewed in a dark surround to a reproduced image to be viewed in an average surround; and substantially a range of 0.83 to 0.99 for an original image viewed in a dark surround to a reproduced image to be viewed in a dim surround for achieving color-appearance matching of a reproduced image to the original image.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of producing improved color-appearance matching between an original image and a reproduction of the original image, when the original and the reproduction are to be viewed in different surrounds. The present invention has the further advantage of producing improved color-appearance matching between two or more reproduced images, when the reproductions are to be viewed in different surround conditions.

DETAILED DESCRIPTION OF THE INVENTION

In the following description, the present invention will be described in the preferred embodiment as a software program. Those skilled in the art will readily recognize that the equivalent of such software may also be constructed in hardware. Although the present invention will be described in a digital format, the present invention may also be implemented by analog electronic circuitry or by conventional photographic means. Those skilled in the art of conventional photography will be able to implement the present invention from the below described preferred embodiment.

Still further, as used herein, computer-readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
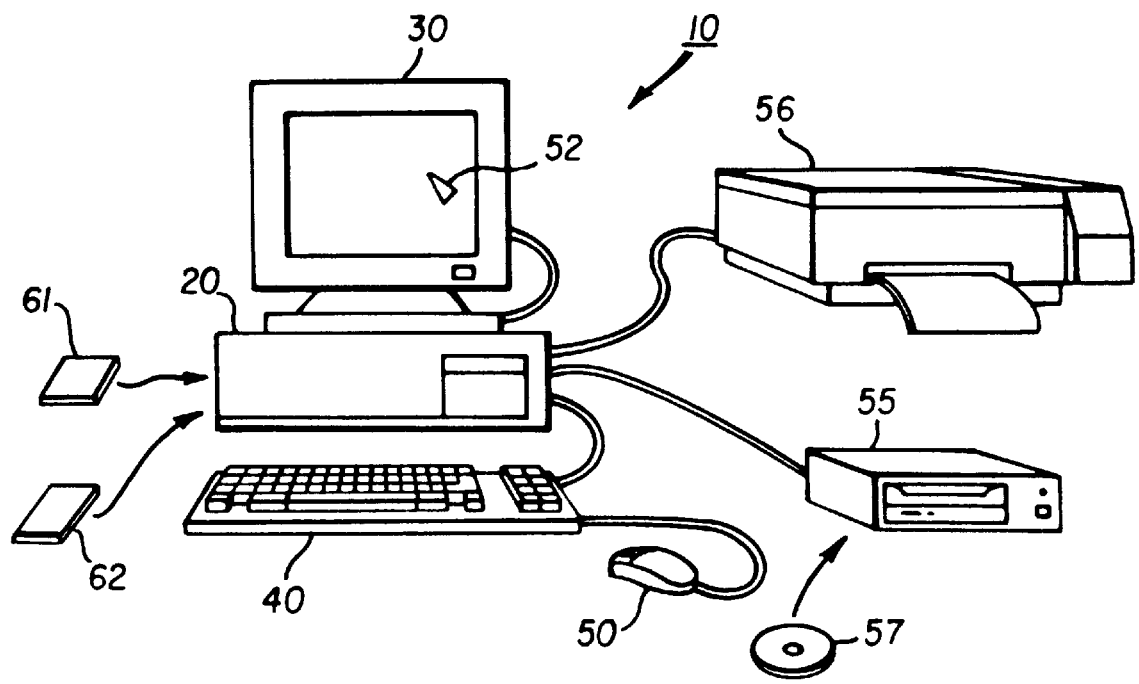
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor based unit 20 for receiving and processing software programs and for performing other processing functions. A display 30 is electrically connected to the microprocessor based unit 20 for displaying user related information associated with the software. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs or/and images and for providing a means of inputting the software programs or/and images and other information to the microprocessor-based unit 20 via a compact disk 57, which typically includes a software program. In addition, a floppy disk 61 may also include a software program, and is inserted into the microprocessor based unit 20 for inputting the software program. Still further, the microprocessor-based unit 20 may be programmed, as is well know in the art, for storing the software program internally. A printer 56 is connected to the microprocessor based unit 20 for printing a hardcopy of the output of the computer system 10.

Images may be displayed on the display 30 by placing a previously captured, original image on a scanner 60 that is electronically connected to the microprocessor-based unit 20. The scanner digitizes the image into a digital representation having a plurality of pixels, each typically having three chromatic code values—usually red, green, and blue, although other color-coordinate systems may also be used. For an 8 bit-per-channel computer system, each chromatic channel typically has code values between 0–255. Alternatively, images may be read from a CD or other digital medium and input into the microprocessor-based unit.

It is instructive to note that the scanner 60, display 30 and printer 56 may be located in locations remote from each other. Also, the microprocessor-based unit 20 may electronically transmit the image to another geographical location, for example from one business location to another business location. Therefore, to assure color-appearance matching between the different surrounds, the present invention implements a transform which compensates for the different surrounds so that color matching may be achieved.

Figure 2:
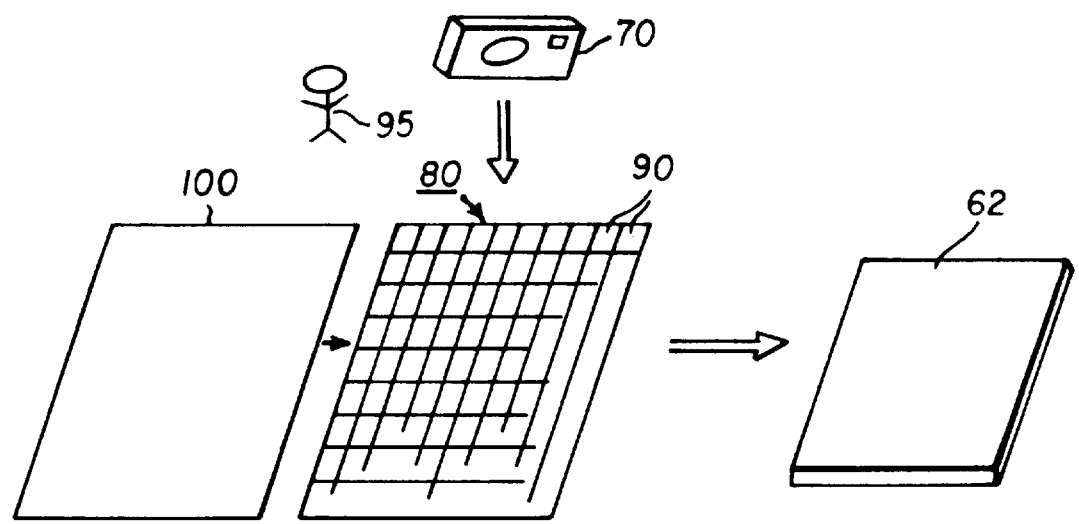
FIG. 2 is a perspective view of a photographic system for capturing an image.

Referring to FIG. 2, for capturing a scene, either a digital or conventional camera 70 may be used. In the case of the digital camera 70, the image 95 is captured on a charged-coupled device (not shown) contained in the camera for forming a digital representation of the image 80; the digital representation 80 includes a plurality of pixels 90 that together form the digital representation. The digital representation 80 is then stored on internal memory or on a PC card 62. The card 62 may then be inserted into the microprocessor-based unit 20 via a PC card reader (not shown) which can retrieve the digital representation 80 of the captured image, or the camera 70 may be electrically connected to the microprocessor-based unit 20 via a cable (not shown). In this case, the digital representation 80 of the image is electronically passed over the cable to the microprocessor-based unit 20.

In the case of a conventional camera 70, the image is captured on conventional film and processed, typically by a photofinisher, for obtaining a hardcopy of the captured image. As described above, in this case, the scanner 60 is used to scan the image into the microprocessor-based unit 20.

Figure 3:
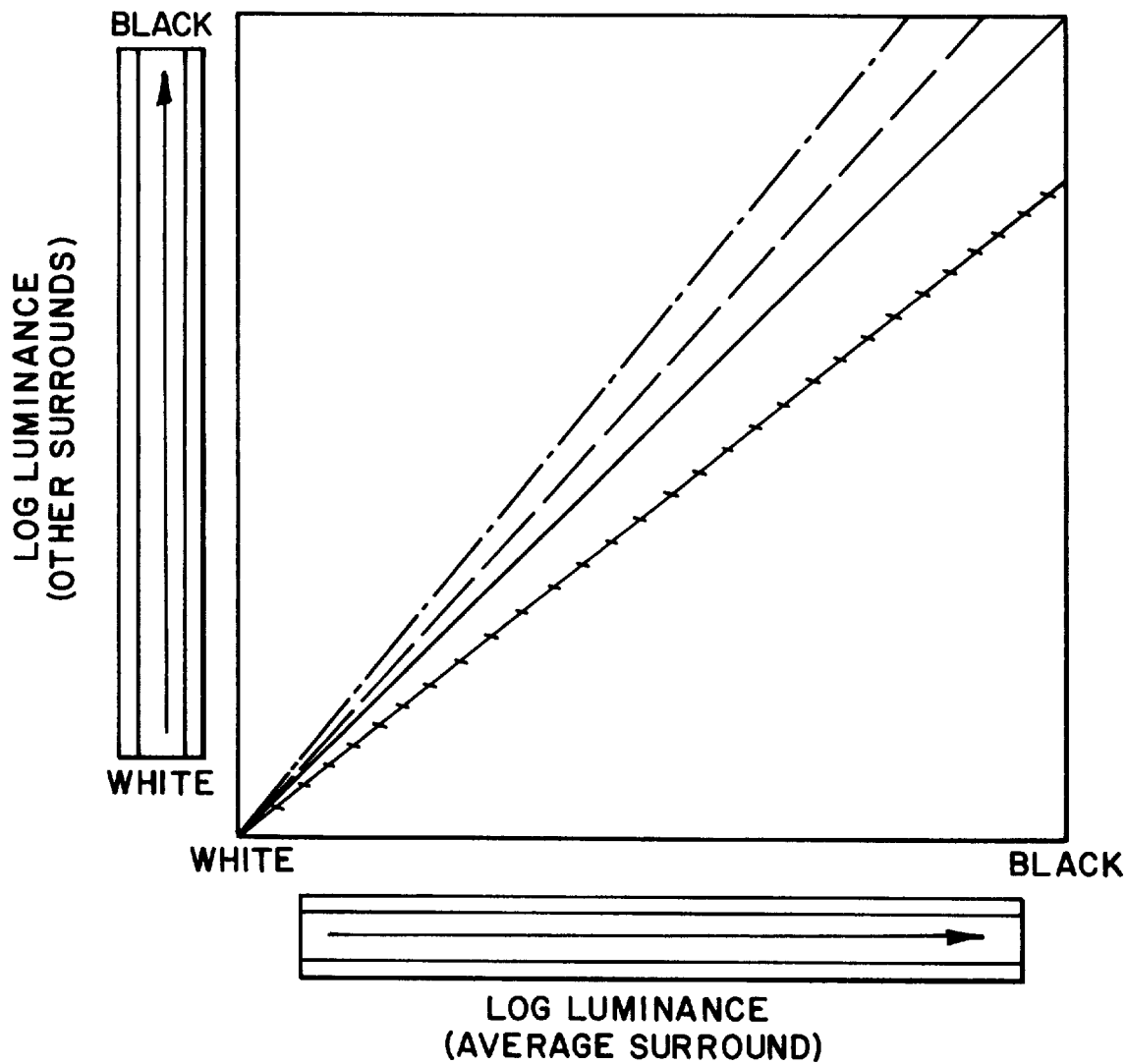
FIG. 3 is a graph illustrating a color-appearance mapping function of the present invention used for color-appearance matching when reproducing an image.

Referring to FIG. 3, a graph is shown illustrating the basic nature of the color-matching transform of the present invention that is implemented via software on the microprocessor-based unit 20. Such a transform may be stored or input to the microprocessor-based unit 20 by any of the above-described methods. However, before discussing the details of the transform, it is instructive to note that the transform is typically implemented such that parameter values depend on the type of surround. The surrounds discussed herein are defined as follows: a surround is defined as "average" if the area immediately surrounding the image is similar in luminance and chrominance to the image itself; a surround is defined as "dark" if the area immediately surrounding the image is similar in chrominance, but significantly lower in luminance than the image itself; a surround is defined as "dim" if the luminance of an area immediately surrounding the image is such that the surround is between average and dark and is similar in chrominance to the image itself; and a surround is defined as "light" if the area immediately surrounding the image is similar in chrominance, but significantly higher in luminance than the image itself.

FIG. 3 illustrates the parameter values associated with the above-defined surrounds. In this regard, the abscissa illustrates the relative luminances of an image displayed in an average surround, and the ordinate illustrates the corresponding relative luminances, for images displayed in other surrounds, that are required for color-appearance matching. For example, in the present invention, the parameter value for transforming images from an average surround to a dark surround is 1.06. As a further example, in the present invention, the parameter value for transforming images from an average surround to a light surround is 0.91. As a further example, in the present invention, the parameter value for transforming images from a light surround to a dark surround is the ratio of 1.06 to 0.91, or 1.16.

For purposes of illustrating the implementation of the transform of FIG. 3, an example of a typical image utilizing the transform will be described. It facilitates understanding to note that the digital image includes a plurality of pixels each typically having three chromatic values, for example red, green, and blue (RGB) values. The values of each pixel will pass through the color-appearance transform in order to achieve color-appearance matching in a different surround.

In the first step of the transformation, the RGB pixel values are transformed to relative CIE XYZ tristimulus (XYZ) values, using techniques well known to those skilled in the art. With relative tristimulus values, Y is scaled between 0.0 for a perfect black and 100.0 for a perfect diffuse white. In the second step of the transformation, the luminance (Y) value of the relative XYZ tristimulus values is transformed as follows:

$$Y' = Y^f$$

where, $f$ is a parameter value, determined based on the relationship of the surround of the original image and the intended surround for the transformed image, as exemplified in FIG. 3. In the final step of the transformation, the X and Z values of the relative XYZ tristimulus values are transformed as follows:

$$X' = X*(Y'/Y)$$

$$Z' = Z*(Y'/Y)$$

Those skilled in the art will recognize that the above transformations will retain the chrominance values (x, y) of the original relative tristimulus values, while altering the luminance (Y) values.

Those skilled in the art will also recognize that any of a variety of methods can be used to further transform the transformed X'Y'Z' values to produce appropriate output signal values. After each pixel of the original image has been transformed, the transformed image values can be transmitted electronically to another location or printed by the printer 56 to form a reproduction having luminance contrast that is appropriate for the intended surround. When viewed in this intended surround, the brightness contrast of the reproduced image will match that of the original image viewed in the original surround.

In an alternative embodiment, the parameter values of the current invention are used to produce an improved color-appearance model based on the RLAB color-appearance model well-known to those skilled in the art. RLAB values are extensions of the well known CIELAB color space values, and are readily converted back to any standard color space values. In this regard, the input data for a stimulus are relative tristimulus values for the CIE 1931 Standard Colorimetric Observer. Relative tristimulus values are defined such that Y is scaled between 0.0 for a perfect black and 100.0 for a perfect diffuse white.

In the RLAB model, $L_R$ values are derived to represent the lightness of a color stimulus that has been defined in terms of relative XYZ tristimulus values. $L_R$ values can be used to predict the lightness of a stimulus, viewed in a second surround condition, based on the colorimetry for the stimulus and a first surround condition. $L_R$ values are determined from the relative luminance (Y) value and the reference white relative luminance value (Yn) according to the following equation:

$$L_R = 116(Y/Yn)^{(1/3) \cdot f} - 16$$

where, $f$ is a surround-parameter value, determined based on the relationship of the second surround to the first surround, as exemplified in FIG. 3.

In the improved RLAB model, when the second surround condition is darker than the first, the recommended values and ranges for the factor $f$ are as follows: 1.10, with a range of 1.01 to 1.15, when the first surround is light and the second surround is average; 1.13, with a range of 1.01 to 1.22, when the first surround is light and the second surround is dim; 1.16, with a range of 1.01 to 1.29, when the first surround is light and the second surround is dark; 1.03, with a range of 1.01 to 1.11, when the first surround is average and the second surround is dim; 1.06, with a range of 1.01 to 1.22, when the first surround is average and the second surround is dark; 1.03, with a range of 1.01 to 1.21, when the first surround is dim and the second surround is dark.

Also in the improved RLAB model, when the second surround condition is lighter than the first, the recommended values and ranges for the factor $f$ are as follows: 0.91, with a range of 0.87 to 0.99, when the first surround is average and the second surround is light; 0.88, with a range of 0.82 to 0.99, when the first surround is dim and the second surround is light; 0.97, with a range of 0.90 to 0.99, when the first surround is dim and the second surround is average; 0.86, with a range of 0.78 to 0.99, when the first surround is dark and the second surround is light; 0.94, with a range of 0.82 to 0.99, when the first surround is dark and the second surround is average; 0.97, with a range of 0.83 to 0.99, when the first surround is dark and the second surround is dim.

The invention has been described with reference to a preferred embodiment. However, it will be appreciated that variations and modifications can be effected by a person of ordinary skill in the art without departing from the scope of the invention. In particular it should be noted that although the recommended parameter values of the present invention are consistently different from those previously defined in the art, the preferred values will lie within a range of possible values. There are several reasons why the preferred parameter value may vary. For example, the value will be influenced by the size of the surround relative to that of the image or stimulus. For complex images, the preferred parameter may also be influenced by the size and placement of particular image elements relative to the surround, as well as by the relationship of differently sized and placed image elements to each other within the image itself.

Parts List:
computer system
microprocessor-based unit
display
keyboard
mouse
icon
CD-ROM
printer
disc
PC card
camera
digital representation
pixels

We claim:

1. A method for achieving color-appearance matching for an image to be viewed in different surrounds, the method comprising the steps of:
   (a) Forming signals representing an original image; and
   (b) mapping the original image signals through a transformation that alters image luminance contrast by a factor of substantially 1.01 to 1.15 for an original image viewed in a light surround to a reproduced image to be viewed in an average surround; substantially 1.01 to 1.22 for an original image viewed in a light surround to a reproduced image to be viewed in a dim surround; substantially a range of 1.01 to 1.29 for an original image viewed in a light surround to a reproduced image to be viewed in a dark surround; substantially a range of 1.01 to 1.11 for an original image viewed in an average surround to a reproduced image to be viewed in a dim surround; substantially a range of 1.01 to 1.22 for an original image viewed in an average surround to a reproduced image to be viewed in a dark surround; substantially a range of 1.01 to 1.21 for an original image viewed in a dim surround to a reproduced image to be viewed in a dark surround; substantially a range of 0.87 to 0.99 for an original image viewed in an average surround to a reproduced image to be viewed in a light surround; substantially a range of 0.82 to 0.99 for an original image viewed in a dim surround to a reproduced image to be viewed in a light surround; substantially a range of 0.90 to 0.99 for an original image viewed in a dim surround to a reproduced image to be viewed in an average surround; substantially a range of 0.78 to 0.99 for an original image viewed in a dark surround to a reproduced image to be viewed in a light surround; substantially a range of 0.82 to 0.99 for an original image viewed in a dark surround to a reproduced image to be viewed in an average surround; and substantially a range of 0.83 to 0.99 for an original image viewed in a dark surround to a reproduced image to be viewed in a dim surround for achieving color-appearance matching of a reproduced image to the original image.

2. The method as in claim 1, wherein the mapping function is implemented via a digital transform.

3. The method as in claim 2, wherein step (a) includes creating a digital representation of the scene so that the original image is in digital form.

4. The method as in claim 1 further comprising the step of converting the original image to RLAB color space for facilitating the mapping of step (b).

5. An apparatus for achieving color-appearance matching for an image viewed in different surrounds, comprising:
   (a) means for forming signals representing an original image; and
   (b) means for mapping the original image signals through a transformation that alters image luminance contrast by a factor of substantially 1.01 to 1.15 for an original image viewed in a light surround to a reproduced image to be viewed in an average surround; substantially 1.01 to 1.22 for an original image viewed in a light surround to a reproduced image to be viewed in a dim surround; substantially a range of 1.01 to 1.29 for an original image viewed in a light surround to a reproduced image to be viewed in a dark surround; substantially a range of 1.01 to 1.11 for an original image viewed in an average surround to a reproduced image to be viewed in a dim surround; substantially a range of 1.01 to 1.22 for an original image viewed in an average surround to a reproduced image to be viewed in a dark surround; substantially a range of 1.01 to 1.21 for an original image viewed in a dim surround to a reproduced image to be viewed in a dark surround; substantially a range of 0.87 to 0.99 for an original image viewed in an average surround to a reproduced image to be viewed in a light surround; substantially a range of 0.82 to 0.99 for an original image viewed in a dim surround to a reproduced image to be viewed in a light surround; substantially a range of 0.90 to 0.99 for an original image viewed in a dim surround to a reproduced image to be viewed in an average surround; substantially a range of 0.78 to 0.99 for an original image viewed in a dark surround to a reproduced image to be viewed in a light surround; substantially a range of 0.82 to 0.99 for an original image viewed in a dark surround to a reproduced image to be viewed in an average surround; and substantially a range of 0.83 to 0.99 for an original image viewed in a dark surround to a reproduced image to be viewed in a dim surround for achieving color-appearance matching of a reproduced image to the original image.

6. The apparatus as in claim 5, wherein the mapping function is implemented via a digital transform.

7. The apparatus as in claim 6, wherein said forming means includes means for creating a digital representation of the scene so that the original image is in digital form.

8. The apparatus as in claim 5 further comprising means for converting the original image to RLAB color space for facilitating the mapping of step (b).

9. A computer program product for achieving color-appearance matching for an image viewed in different surrounds, comprising: a computer readable storage medium having a computer program stored thereon for performing the steps of:
   (a) forming signals representing an original image; and
   (b) mapping the original image signals through a transformation that alters image luminance contrast by a factor of substantially 1.01 to 1.15 for an original image viewed in a light surround to a reproduced image to be viewed in an average surround; substantially 1.01 to 1.22 for an original image viewed in a light surround to a reproduced image to be viewed in a dim surround; substantially a range of 1.01 to 1.29 for an original image viewed in a light surround to a reproduced image to be viewed in a dark surround; substantially a range of 1.01 to 1.11 for an original image viewed in an average surround to a reproduced image to be viewed in a dim surround; substantially a range of 1.01 to 1.22 for an original image viewed in an average surround to a reproduced image to be viewed in a dark surround; substantially a range of 1.01 to 1.21 for an original image viewed in a dim surround to a reproduced image to be viewed in a dark surround; substantially a range of 0.87 to 0.99 for an original image viewed in an average surround to a reproduced image to be viewed in a light surround; substantially a range of 0.82 to 0.99 for an original image viewed in a dim surround to a reproduced image to be viewed in a light surround; substantially a range of 0.90 to 0.99 for an original image viewed in a dim surround to a reproduced image to be viewed in an average surround; substantially a range of 0.78 to 0.99 for an original image viewed in a dark surround to a reproduced image to be viewed in a light surround; substantially a range of 0.82 to 0.99 for an original image viewed in a dark surround to a reproduced image to be viewed in an average surround; and substantially a range of 0.83 to 0.99 for an original image viewed in a dark surround to a reproduced image to be viewed in a dim surround for achieving color-appearance matching of a reproduced image to the original image.

10. The computer program product as in claim 9, wherein the mapping function is implemented via a digital transform.

11. The computer program product as in claim 10, wherein step (a) includes creating a digital representation of the scene so that the original image is in digital form.

12. The computer program product as in claim 9 further comprising the step of converting the original image to RLAB color space for facilitating the mapping of step (b).

* * * * *